(No Model.)
L. RICARD.
AX OR EDGE TOOL.
No. 421,868. Patented Feb. 18, 1890.
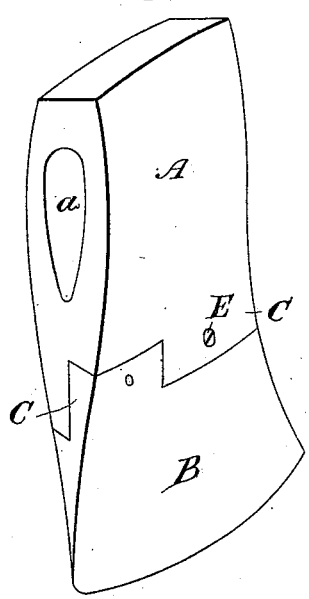
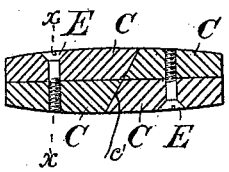
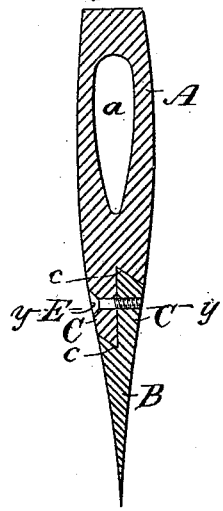
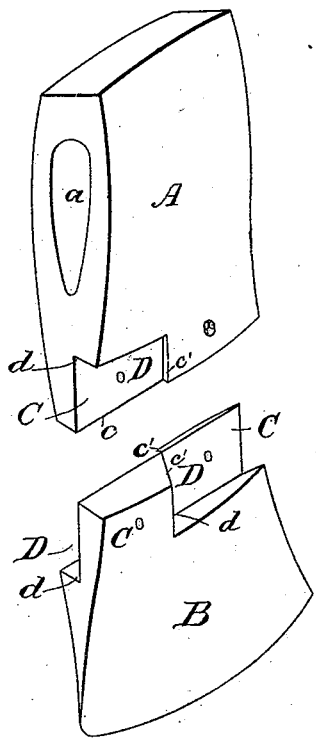
Witnesses:
Chas. Raley.
L. N. Legendre.
Louis Ricard
Inventor,
A. Harvey
Attorney.

UNITED STATES PATENT OFFICE.

LOUIS RICARD, OF ROCKLAND, ONTARIO, CANADA, ASSIGNOR TO ISAAC LANGFORD WOODLEY AND JOHN ALBERT DENT, BOTH OF SAME PLACE.

AX OR EDGE TOOL.

SPECIFICATION forming part of Letters Patent No. 421,868, dated February 18, 1890.

Application filed August 8, 1889. Serial No. 320,187. (No model.)

*To all whom it may concern:*

Be it known that I, LOUIS RICARD, of Rockland, in the Province of Ontario, in the Dominion of Canada, have invented certain new and useful Improvements in Axes or other Edge Tools; and I do hereby declare that the following is a full, clear, and exact description of the same, reference being had to the accompanying drawings, forming a part hereof.

My invention, which will be hereinafter fully set forth and claimed, relates to devices for securing cutting-edges to axes and other edge tools.

The object of my invention is to provide an ax or other cutting-tool with a removable blade or cutting-edge, so that the latter can be changed at any time at will.

Figure 1 is a perspective view of an ax constructed according to my invention. Fig. 2 is a vertical cross-section of the same on line $x\,x$, Fig. 3. Fig. 3 is a transverse section of the same on line $y\,y$, Fig. 2; and Fig. 4 is a perspective view showing the pieces apart.

A is the ax head or poll containing the eye $a$, and may be produced by die-forging, casting, or any other desired manner.

B is the blade, made wholly or partially of steel or such other metal as may be desired for the cutting-edge; but said blade is not welded or otherwise permanently joined to the body of the tool or the poll or head of an ax. The two parts are jointed together by an interlocking joint resembling somewhat a dovetail joint, as shown in the drawings. This joint consists on each piece of two projections C and two recesses D, each taking half the thickness of the body and approximately half the length. The projections C and recesses D are at diametrically-opposite corners, and the projections on one of the pieces—say A—are made to fit exactly in the corresponding recesses of the other piece B, and vice versa, being exact counterparts. The ends $c$ of said projections are beveled so as to lengthen toward the inner edge, so that the projection is longer at its inner edge than at its outer or face line. The bottom $d$ of each recess is beveled or undercut or formed to correspond to and fit the end $c$. The projections C and recesses D are parted lengthwise at a line $c'$ oblique to the face of the joint. This joint holds the two pieces together firmly in a lateral direction and simply requires to be held and secured in the longitudinal direction of the body of the tool, which is done by passing a screw E through each pair of projections, these screws having of course sunk heads and are inserted from opposite sides, the screw-holes in which the end of the screw rests being tapped. It will of course be understood that in the case of tools other than axes the number of projections lengthwise can be increased at pleasure.

One of the chief advantages in the manufacture of this construction is that the necessity of welding steel to iron is done away with, also that both pieces can be produced in a cheaper manner. The advantage in using axes and other tools of this construction is in being able to carry about sharp blades to replace blunted ones when they are being used at a distance from any convenience for sharpening.

I claim as my invention—

1. An ax or other edge tool having a body A and a separate blade B, jointed together by projections C, with beveled ends $c$ on diagonal corners, and corresponding recesses D, with undercut bottoms $d$, and held together by screws E, substantially as set forth.

2. In an ax, the combination of the head or poll A, having the eye $a$, projections C at the corners diagonally opposite each other and having beveled ends $c$, and provided with screw-holes, one of which is tapped, and recesses D, having undercut bottoms $d$, and separated from the projections C by an oblique line $c'$, and said recesses being the exact counterparts of the projections C, substantially as set forth.

3. In an ax, the combination of the blade B, projections C, having beveled ends $c$ at corners diagonally opposite and provided with screw-holes, one of which is tapped, and recesses D, having undercut bottoms $d$, and separated from the projections at an oblique line $c'$ and being exact counterparts of said projections, substantially as set forth.

4. In an ax, the combination of the head A, having the eye $a$ and provided with projections C, and recesses D, placed at diagonally-opposite corners and separated at an oblique line $c'$, the blade B, having projections C, and recesses D, which are exact counterparts of the recesses and projections on the poll, and the screws E, passing through said projections from opposite sides, substantially as set forth.

In testimony whereof I have signed this specification in the presence of the undersigned witnesses.

LOUIS RICARD.

Witnesses:
A. HARVEY,
A. TROWSE.